(No Model.)
A. A. GAMBLE.
HAY PRESS.
No. 396,203. Patented Jan. 15, 1889.
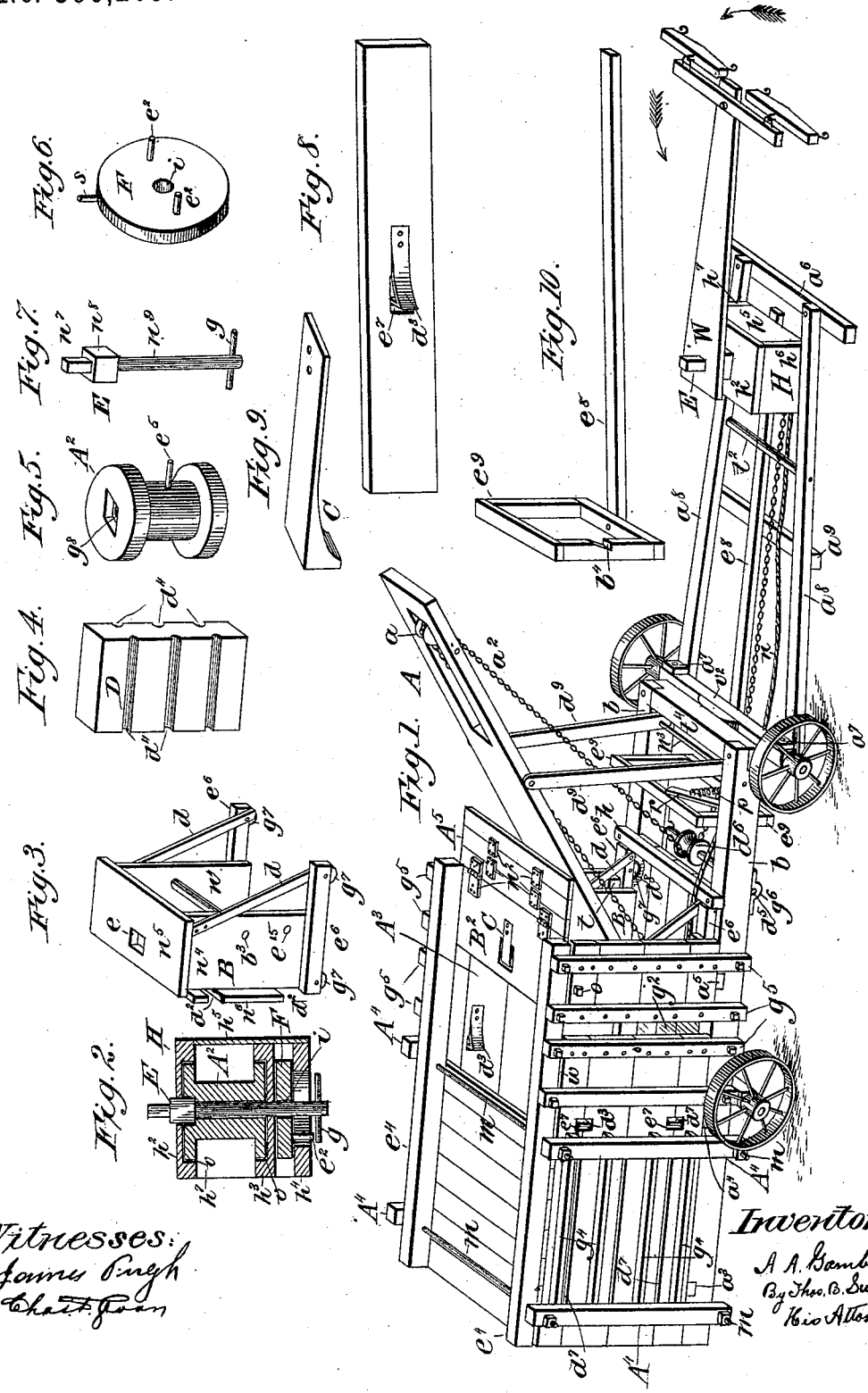

UNITED STATES PATENT OFFICE.

ALPHONSO A. GAMBLE, OF WAVELAND, IOWA.

HAY-PRESS.

SPECIFICATION forming part of Letters Patent No. 396,203, dated January 15, 1889.

Application filed May 14, 1888. Serial No. 273,901. (No model.)

*To all whom it may concern:*

Be it known that I, ALPHONSO A. GAMBLE, a citizen of the United States, residing at Waveland township, in the county of Pottawattamie and State of Iowa, have invented a new and useful Hay-Press, of which the following is a specification.

The objects of my invention are to provide a hay-press by the use of which hay can be compactly pressed and rapidly baled; also, a hay-press of sufficient power to press closely and completely at each and every inward movement of the ram at least one hundred pounds of hay, and also a press so constructed that all the pressure that is applied to the hay can be retained after the power is removed until the hay is tied into bales. I attain these objects by the hay-press illustrated in the accompanying drawings, in which—
Figure 1 is a perspective view of the hay-press. Fig. 2 is a detailed vertical central sectional view of the driving-rod, spool, wheel, and frame that holds the spool and wheel. Fig. 3 is a detailed perspective view of the car. Fig. 4 is a perspective view of one of the heads. Fig. 5 is a detailed perspective view of the spool. Fig. 6 is a detailed perspective view of the wheel for the rope. Fig. 7 is a detailed perspective view of the driving-rod. Fig. 8 is a detailed perspective view of one of the springs for holding the head, showing it secured to the inside of one of the planks that cover the side of the press-box or hay-receptacle. Fig. 9 is a detailed perspective view of the cover spring or catch, and Fig. 10 is a detailed perspective view of the frame and the lever attached thereto that lifts the driving-rod.

Similar letters refer to similar parts throughout the several views.

The longitudinal pieces or timbers $b\ b$ and $e^4\ e^4$, the cross pieces or timbers $a^3\ a^4\ a^5\ t^4$, and the upright pieces $A^4\ A^4\ A^4\ A^4$ and $g^5\ g^5\ g^5\ g^5$ $g^5\ g^5\ g^5\ g^5$ constitute the frame of the press.
The cross-pieces $a^3\ a^4\ a^5\ t^4$ are firmly secured at their ends to the longitudinal pieces $b\ b$. The upright pieces $g^5\ g^5\ g^5\ g^5\ g^5\ g^5\ g^5\ g^5$ are firmly secured at their ends (four on each side of the press) to the pieces $b\ b$ and $e^4\ e^4$.
The upright pieces $A^4\ A^4\ A^4\ A^4$ are secured (two on each side of the press) at their lower ends to the pieces $b\ b$ and at their upper ends to the pieces $e^4\ e^4$ by means of the rods $m\ m$ $m\ m$. The horizontal pieces $g^4\ g^4\ g^4\ g^4$ are upon both sides of the press and extend from one upright piece $A^4$ to the other upright piece $A^4$ on the same side of the press. The ends of the pieces $g^4\ g^4\ g^4\ g^4$ rest between the planks that cover the sides of the press and the upright pieces $A^4\ A^4\ A^4\ A^4$. The press box or receptacle K, wherein the hay is received and compressed, is open at each end, the pieces $b\ b$ and the planks resting upon the cross-pieces $a^3\ a^4\ a^5$, constituting the floor of the press-box, its sides being of plank, and the planks that extend from the opening $g^2$ to the rear of the press are secured at their forward ends only to the upright pieces $g^5$. Its top from the upper front rod $m$ back to the rear end of the press is covered with planks, the ends of which rest between the side planks and the pieces $e^4\ e^4$, and the remainder of the top is covered by means of the sliding cover $A^5$, which is composed of boards hinged together with the hinges $n^2\ n^2\ n^2$. This cover slides in spaces between the side planks and pieces, $e^4$. When the car B is in the forward end of the press-box, as shown in Fig. 1, the press-box K, from the opening $g^2$ back to the rear end of the press, is smooth and free from all obstructions excepting the springs $d^3\ d^3$. The aperture $g^2$ opens into the press-box K, and is used to insert the heads D into the press-box. The ram A is provided with the pulley $a$, arms $d^9\ d^9$, pivoted at their upper ends to the ram A, and at their lower ends connected by means of the rod $n^3$ to the pieces $b\ b$. The wheel or pulley $d^6$ is secured to the shaft $d^5$. The spool $A^2$ revolves in the box or frame H, and the sweep W is connected by means of the driving-rod E to the spool $A^2$. The chain $a^2$ passes over the pulley $a$ and under the wheel $d^6$, and is firmly secured at one end to the cross-piece $a^5$ and at the other end to the pin $e^5$ of the spool $A^2$. The ram, chain, and pulley constitute the leverage used in pressing the hay. The end of the ram A, not having the pulley $a$, is pivoted by means of the rod $b^3$ to the car B. The shaft $d^5$, which has secured to it the wheel $d^6$, revolves in journal-boxes $g^6$, secured to the pieces $b\ b$. The car B consists of the two bottom pieces, $e^6\ e^6$, provided with the trucks $g^7\ g^7\ g^7$; there being four of these trucks, two on each side of the car. The side boards or pieces, $n^4 n^4$, are secured at their lower ends to the inside of the pieces $e^6 e^6$, the top board or piece, $n^5$, being secured to the upper ends of the boards $n^4 n^4$ and having the aperture $e$, the board $n^6$ having upon each of its ends notches $d^2 d^2$, and which is secured to the boards $n^4 n^4$ and the braces $d\ d$. The notches $d^2 d^2$ are for the purpose of permitting the car to pass backward and forward in the press-box K without coming in contact with the springs $d^3 d^3$, the springs passing through the notches $d^2 d^2$.

Opening into the press-box K are the slots or apertures $d^7 d^7 d^7$, there being in all six of these apertures, three on each side of the press. These apertures are for the purpose of facilitating the passage of wire to bale the hay. The head D has extending across it the grooves $d^4 d^4 d^4 d^4 d^4 d^4$. When the head D is in that portion of the press-box having the apertures $d^7 d^7 d^7$, the grooves come even with the apertures. These grooves permit the passage of wire to bale the hay. It is necessary to use several of these heads in baling hay.

The driving-rod E consists of the upper square portion, $n^7$, which passes through the end of the sweep W, the enlarged square portion, $n^8$, that fits into the square portion of the aperture of the spool $A^2$, the round part $n^9$, which passes through the spool $A^2$, and the pin $g$. The wheel F has at its side the pin $s$. In order to conveniently move the press and to keep it at a proper distance from the ground, it is placed on wheels, as shown in Fig. 1. The box or frame H, that contains the spool $A^2$ and wheel F, consists of the side pieces, $h^5 h^7$, the top piece, $h^2$, the division-piece $h^3$, and the bottom piece, $h^4$. The top, division, and bottom pieces are firmly secured to the side pieces. The top, division, and bottom pieces all have apertures for the passage of the driving-rod E, and the aperture through the bottom piece, $h^4$, is of sufficient size to allow the pins $e^2 e^2$ of the wheel F and the pin $g$ of the driving-rod to revolve therein. The under portion of the top piece, $h^2$, and the upper portion of the division-piece $h^3$ have dishes or hollows $v\ v$ to receive the ends of the spool $A^2$, as shown in Fig. 2.

The frame or box H is firmly secured to the arms or holders $a^8 a^8$. These arms have pins or uprights $a^7 a^7$ extending upward against the front part of the axle-tree $v^2$. The forward ends of the arms $a^8 a^8$ are secured to and rest upon the cross-piece or support $a^6$. The cross-piece $a^9$, which is secured to the under sides of the arms $a^8 a^8$, acts as a fulcrum for the lever $e^8$. The roller $t^2$ is journaled to the arms $a^8 a^8$ and is for the purpose of holding up and supporting the chain $a^2$, so that it will properly wind around the spool $A^2$. The wheel F has the aperture $i$ in its center, and is provided at its lower side with the pins $e^2 e^2$, which extend downward from the wheel. It also has secured to its periphery the pin $s$. The spool $A^2$ has passing through it the aperture $g^8$, which is round at its middle and lower portion and enlarged and square at its upper part to receive the square part $n^8$ of the driving-rod E. The circumference of the spool is enlarged at each of its ends, and there is firmly secured to its periphery the pin $e^5$.

The springs $d^3 d^3$ are secured at one of their ends to the inside of the side planks of the press-box K, there being two secured to each side of the press-box. The free ends of the springs $d^3 d^3$ are bent toward the plank to which they are secured and enter when forced by the head D into the slots or apertures $e^7 e^7$ in the sides of the press-box, there being one of these apertures for the free end of each spring to enter. The lever $e^8$ has secured to it at one of its ends the frame $e^9$, having in one of its side pieces the notch $b^4$. The lever $e^8$ rests upon the cross-piece $a^9$ as its fulcrum, and the forward end of the lever rests under the driving-rod E, and the frame $e^9$ remains between the pieces $b\ b$. The lever $r$ is pivoted a short distance from its lower end to the side of one of the pieces $b$. The spiral spring $p$ is secured at one end to the lever $r$ above the pivot of the lever and at the other end to the side of the piece $b$. This spring, by pulling upon the upper part of the lever $r$, forces the lower end of the lever $r$ against the side piece of the frame $e^9$, provided with the notch $b^4$, so that when the frame $e^9$ is moved downward far enough the lower end of the lever $r$ enters the notch $b^4$ and holds down the frame $e^9$.

The cover spring or catch C is secured at one end to the top of the cover $A^5$, and the other end extends downward through the aperture $B^2$ and enters, when the car B is in the right position, the aperture $e$ of the car B. One end of the rope $n$ is secured to the side of the car B by tying it through the aperture $e^{25}$ of the car. The other end of the rope is secured to the pin $s$ of the wheel F. The guides $t$ are simply narrow strips of board nailed on the inside of the planks just above the pieces $e^6 e^6$ of the car, and they extend backward to the opening $g^2$. These guides—there being one above each of the pieces $e^6 e^6$—prevent the front end of the car B from tipping upward when it first starts to force the head D against the hay. The stop $h$, which is secured at its ends to the pieces $b\ b$, prevents the car B from moving forward beyond it. When the car B is moved forward so that it comes in contact with the stop $h$, the forward trucks of the car sink into the hollows $d^8 d^8$, which hold the car sufficiently to prevent the weight of the ram A from forcing it backward. When the car B is forward against the stop $h$ and the sliding cover $A^5$ is open, as shown in Fig. 1, the rod $o$, which passes across the press, is directly between the top of the car and that portion of the spring C which passes through the aperture $B^2$ of the cover $A^5$. The ends of the horizontal pieces $g^4 g^4 g^4 g^4$, being between the upright pieces $A^4 A^4 A^4 A^4$ and the plank, cause the upright pieces $A^4 A^4 A^4 A^4$, when the outside of the plank is even with the outside of the pieces $b\ b, e^4\ e^4$, to stand away from the pieces $b\ b, e^4\ e^4$ a distance equal to the thickness of the pieces $g^4$ $g^4\ g^4\ g^4$, and as the plank along and against which the pieces $g^4\ g^4\ g^4\ g^4$ extend are fastened at their forward ends only, it is evident that by turning on the nuts of the rods $m\ m$ $m\ m$ the upright pieces $A^4\ A^4\ A^4\ A^4$ will be drawn toward the horizontal pieces $b\ b, e^4\ e^4$, and will force the pieces $g^4\ g^4\ g^4\ g^4$ with the plank next to them inward, and thus decrease the size of the middle and rear portions of the press-box K.

The press is operated as follows: A head, D, is placed in the press-box K just back of the springs $d^3\ d^3$. The middle and rear portions of the press-box are then reduced in size by turning on the nuts of the rods $m\ m$ $m\ m$ to such an extent that the side plank of the press-box will press so hard against the head D that it will require much force to move the head D toward the rear end of the press-box. Another head D is then inserted through the opening $g^2$ and placed beside the notched side of the car B. The space in the press-box between the two heads is then filled with hay by inserting it through the opening $A^3$. The opening $A^3$ is then closed by the sliding cover $A^5$. The horses, which are attached to the end of the sweep W, are then made to travel around the box H in the direction that the arrows point in Fig. 1. This revolves the spool $A^2$ and winds around it the chain $a^2$, which causes the ram A to move downward and into the press-box and to force the car B against the head D that is next to the car, and this movement of the ram continues until the hay and head next to the car are pushed past the free ends of the springs $d^3\ d^3$. The free ends of the springs, which were forced by the head D when passing by them into the slots or apertures $e^i\ e^i$, rebound as soon as the head has passed them and hold the head firmly against the hay, and the hay is then held pressed between the two heads. As soon as the head next to the car is pushed past the springs $d^3\ d^3$, the inward movement of the ram and car is arrested, on account of the arms $d^9\ d^9$ having assumed nearly a horizontal position and pressing down the frame $e^9$, with the end of the lever $e^8$ attached to it, far enough to enable the lower end of the lever $r$ to enter the notch $b^4$ and hold down that end of the lever $e^8$ having the frame secured to it. This causes the other end of the lever $e^8$ to rise and force upward the driving-rod E far enough to move the square portion $n^8$ of the driving-rod out of the aperture of the spool $A^2$, which unlocks the spool from the driving-rod and at the same time locks the wheel F to the driving-rod by the pin $g$ coming in contact with the pins $e^2\ e^2$. This causes the wheel F to revolve and to wind around it the rope $n$, which draws the car B to and against the stop $h$ and causes the ram to be elevated to the position it assumed before the hay was placed in the press-box. The horses are then stopped and another head D is inserted through the opening $g^2$ and placed next to the notched side of the car. A sufficient quantity of hay to make a bale of the desired weight is again placed in the press-box and the cover $A^5$ closed. The lever $r$ is then forced by the hand from the notch $b^4$, which lets the driving-rod fall and lock itself to the spool and unlock itself from the wheel F, and the horses are then started and the hay pressed, as before explained.

To press the hay, it is necessary that the rear portion of the press-box should be obstructed with something that it will require considerable force to move. Therefore, in commencing to press a quantity of hay, it is at first obstructed by a head D, as before stated; but after three bales of hay have been pressed it is obstructed by them, as the press-box from the free ends of the springs $d^3\ d^3$ back to its rear end holds three one-hundred-pound bales of hay. After the rear portion of the press-box becomes filled with pressed hay it should be made a little larger by turning partly off the nuts of the rods $m\ m\ m\ m$ than it was when the first lot of hay was pressed. The size of the rear portion of the press-box should be regulated in such a manner that the force necessary to move the bales or lots of pressed hay through the rear portion of the press-box will just be sufficient to compactly press the hay.

A head D has to be inserted through the opening $g^2$ and placed next to the notched side of the car every time a bale of hay is pressed. These heads keep the different lots of hay separate when in the rear portion of the press-box, and also assist in tying the wire around the hay. Wire is tied around the hay in the usual manner while the hay is in the rear portion of the press-box by pushing or drawing it through the openings $d^i\ d^i\ d^i$ and the grooves in the heads. After three lots of hay are forced into the rear portion of the press-box, a bale of hay and a head drop out of the hind end of the press-box every time the ram moves inward. When the car B has moved into the press-box far enough to force the head D past the springs $d^3\ d^3$, then the spring or catch C enters the aperture $e$ in the top of the car and secures the sliding cover $A^5$ to the car, and when the car is drawn toward the stop $h$ by the rope it takes the sliding cover with it and opens the aperture or opening $A^3$; but just before the car reaches the stop $h$ the rod $o$ passes between the top of the car and the cover $A^5$ and forces the spring C out of the aperture $e$ and releases the cover $A^5$ from the car. When the wheel F is unlocked from the driving-rod, it revolves on the rod as a pivot and allows the rope to unwind as the car moves into the press-box, and when the spool is unlocked from the driving-rod it revolves in the box or frame H and permits the chain to unwind as the car moves toward the stop $h$. When the car is driving the head past the springs $d^3\ d^3$, and the ram and arms $d^9\ d^9$ have assumed nearly a horizontal position, the power of the press is much greater than it is when the ram is elevated, as shown in Fig. 1, because the purchase of the ram and arms $d^9$ $d^9$ increases as they move toward a horizontal position. Thus the press has its greatest power when it is most needed to compactly press the hay. The great advantage that my press has over all others with which I am acquainted is that hay sufficient for an entire bale of hay of ordinary size is placed in the press-box through a large opening before any portion of the bale is pressed, and that the press has power to compactly press an entire ordinary bale of hay at each and every inward movement of the ram, and that no part of the power applied to the hay is lost by permitting the hay to recoil after the pressure has been removed.

Having described my invention, what I claim as new, and desire to secure by Letters Patent, is—

1. A baling-press windlass consisting of the frame H, the spool $A^2$, the wheel F, provided with the pins $e^2$, the driving-rod E, provided with the pin $g$, and which passes through the spool and wheel, the sweep $w$, mounted upon the driving-rod, and the lever $e^8$, provided with a fulcrum and having one end resting under the end of the driving-rod, all combined substantially as described.

2. The press-box K, the car B, the ram A, pivoted to the car and provided with the pulley $a$, the arms $d^9$, pivoted to the ram, the frame H, the spool $A^2$, supported in the frame, the wheel F, supported in the frame and having the pins $e^2$, the driving-rod E, provided with the pin $g$, and which passes through the spool $A^2$ and wheel F, the sweep $w$, mounted upon the driving-rod, the lever $e^8$, provided with a fulcrum and having secured to one end the frame $e^9$, the rope $n$, secured at one end to the car and at the other end to the wheel F, and the chain $a^2$, which passes over the pulley $a$ and is secured at one end to the frame of the press and at the other to the spool, all combined substantially as described.

ALPHONSO A. GAMBLE.

Witnesses:
 FRANK B. HUCKSTEP,
 JAMES PUGH.